Patented Mar. 20, 1945

2,371,908

UNITED STATES PATENT OFFICE 2,371,908

RECOVERY OF OLEFINIC HYDROCARBONS

Rupert C. Morris, Berkeley, and Theodore W. Evans, Oakland, Calif., assignors to Shell Development Company, San Francisco, Calif., a corporation of Delaware No Drawing. Application April 29, 1940, Serial No. 332,366

12 Claims. (Cl. 183—115)

This invention relates to a method for the separation, or purification, or both, of vapor mixtures of narrow boiling range comprising two or more hydrocarbon components of different degrees of saturation, by contacting such a vapor mixture with a relatively high boiling liquid, which liquid is modified to have improved properties for use in said method. More particularly it relates to a process for separating diolefines, acetylenes, etc., from mono-olefines, paraffines and the like by contacting mixtures of these with certain water soluble organic solvents whose properties for separation according to said method have been improved by the addition of water.

Processes of this type may be carried out in two principal ways. In the first the vapor may be scrubbed by the relatively high boiling selective solvent in a spray, packed, or bubble plate tower by a stream of selective solvent flowing countercurrently to the vapor. In the second method, the so-called extractive distillation, the solvent is caused to flow down a distillation column as the distillation proceeds and as the vapors ascend from the kettle. Thus the solvent scrubs the vapors in a first zone, selectively dissolving the more soluble component, and the resulting fat solvent is partially stripped in a second zone by vapor ascending from the distillation kettle having a higher temperature than the first zone. An improvement over this second method comprises operating the zones of contact substantially isothermally as is explained in our co-pending application Serial No. 329,482, filed April 13, 1940.

In the above methods the dissolved components are then recovered from the fat solvent by distillation, whereby a lean solvent is produced which is recirculated.

By application of the above methods it is frequently possible to separate constituents of a group of narrow boiling range compounds which would be quite impossible to separate by ordinary distillation methods.

The practicability of any such process depends on a number of factors, such as the relative volatilities of the dissolved materials, the concentrations of the solutes, the stability of the solvent, and the ease of separation of solutes and solvent. These factors vary with the temperature and pressure of the operation. This complexity prevents the setting up of a simple criterion for evaluating the "efficiency" of the process, and more particularly for evaluating the part played by the solvent in the determination of the final efficiency. Therefore progress must for the most part be made on an empirical basis.

It is the object of our invention to improve the efficiency of solvents employed in vapor-liquid processes for the separation or purification of hydrocarbon compounds of different degrees of saturation.

Many different solvents have been proposed for use in such processes, e. g. furfural, dioxane, chlorex, aniline, glycol monoacetate, glycol diacetate, glycol monomethyl ether, etc. U. S. Patent 1,875,311 discloses the use of 95% ethyl alcohol and other water-soluble polyhydroxy compounds such as ethylene and propylene glycol.

We have discovered that the addition of water to certain solvents other than simple alcohols improves them for the removal of diolefines such as butadiene or acetylenes from a gaseous mixture comprising monoolefines, paraffins and the like, which are commonly associated with diolefines. Our aqueous solvents so obtained are superior to the aqueous ethyl alcohol and other polyhydroxy alcohols heretofore used for the purpose.

The solvents which we have discovered to give increased efficiency by the addition of water thereto when employed under the conditions described above are morpholine, dioxane, acetone, methyl ethyl ketone, lactonitrile, acetonitrile. Of these we prefer water solutions of acetone, acetonitrile and dioxane, because of their ready availability and because they have been found to have a high degree of selectivity for diolefines.

Our water-modified solvents may be used either alone or mixed, and they are in general suitable for the separation in vapor-liquid extraction processes of hydrocarbons of greater degree of saturation from hydrocarbons of lesser degree of saturation, said hydrocarbons having boiling temperatures substantially below that of water and the solvent employed, being applicable to the separation of acetylene from ethane or ethylene, ethylene from ethane, propylene from propane, butadiene from butylenes, butane, etc., butylenes from butane, pentadienes such as isoprene from fractions containing five carbon atoms, cyclopentadiene from cyclopentane or pentenes, etc.

The optimum amount of water to add to the solvent to improve it varies with the particular solvent in question and the substances to be separated, but in general amounts between 5% and 35% and preferably between 7% and 25% are suitable. The most suitable amount for a given separation may be found by experiment as the result of a compromise between the reduced absolute solubility of the unsaturated hydrocarbon in the solvent and the increased degree of selectivity for the hydrocarbon. It is obviously impractical to employ so large an amount of water that the absolute solubility becomes negligible even if the selectivity is increased by such high dilution.

The most suitable operating temperature varies with the pressure maintained during the operation and is also a compromise, since in general the selectivities of these solvents seem to increase with an increase in temperature, while simultaneously there is a decrease in the absolute solubility as the temperature is increased, so that at the boiling temperature of the solvent at the existing pressure substantially no hydrocarbon will dissolve no matter how high the "selectivity" might become. In general we prefer to operate at a temperature substantially below the boiling point of the solvent but slightly above the condensation temperature of the most readily condensable constituent of the vapor at the existing pressure. For example, as found by experiment when employing a 10% water 90% acetone solution as solvent for the separation of butadiene from butylenes, atmospheric temperatures, e. g. about 20° C., are normally suitable. Substantially atmospheric pressures may be maintained, though the extraction may be carried out either at super or subatmospheric pressures if care is taken to adjust the temperature so that the mixture to be extracted does not condense and the solvent does not vaporize excessively. It is sometimes desirable to operate under superatmospheric pressure. For example, when operating under 25 to 100 lbs. gauge pressure for butadiene separation, not only the column size is reduced but also the thermal requirements are appreciably lowered compared to those needed at atmospheric pressure. Also, a superatmospheric pressure is useful to suppress foaming of the solvent.

The amount of the solvent should be at least sufficient to dissolve a major portion of the constituent to be extracted. In some cases a considerable excess over this amount may be used especially when it is desired to scrub the last traces of the more soluble constituent from the vapor. The most economical amount varies with the nature of the solvent involved, the temperatures and pressures employed, and the particular mixture to be extracted. It can be found by experiment.

Regeneration of the solvent may be carried out by any of the conventional methods such as heating, and/or the reduction of pressure, and the thus regenerated solvent may be returned to the contact zone for use in another cycle.

*Example*

A mixture of 38.5% butadiene and 61.5% butylenes in the vapor state was countercurrently extracted in a 40 plate extraction column with different solvents, the butadiene feed mixture entering the column about the middle. Operation with pure acetone was compared with operation employing a solution of 90% acetone 10% water under the conditions described below. Both runs were isothermal, the column being jacketed by a recirculating water jacket. The pressures maintained in both runs were substantially atmospheric.

|  | Run #1 | Run #2 |
| --- | --- | --- |
| Solvent | Acetone | 90% acetone, 10% water. |
| Reflux ratio | 15/1 | 15/1. |
| Solvent feed rate | 14.8 cc/min | 16.3 cc/min. |
| Feed rate | 300 cc/min | 250 cc/min. |
| Gas returned to bottom of column. | 1800 cc/min | 1500 cc/min. |

The analysis of the products follows:

|  | Run #1 | Run #2 |
| --- | --- | --- |
| Butadiene content of top product. | 13.8% | 2.1%. |
| Butadiene content of bottom product. | >98% | >98%. |

The above data show that the acetone-water mixture is much superior as a solvent since when it is used only 2.1% butadiene is lost in top product whereas 13.8% is lost in the top product in the case where pure acetone is used, even though the same reflux ratios are employed.

We claim as our invention:

1. A process for the separation of butadiene from butylenes which comprises introducing a gaseous mixture of butadiene and butylenes into an extraction zone wherein it is contacted with a liquid solvent which consists of water and acetone, and contains about 10% by weight of water, flowing through the extraction zone, withdrawing gaseous butylenes substantially free of butadiene from the upper portion of the extraction zone, and withdrawing a liquid solution of butadiene substantially free of butylenes from the lower portion of the extraction zone.

2. A process for separation of butadiene from butylenes which comprises introducing a gaseous mixture of butadiene and butylenes into an extraction zone wherein it is contacted with a liquid solvent continuously caused to flow through the extraction zone, said liquid solvent consisting of water and a solvent of the group consisting of acetone and methyl ethyl ketone, and containing from 5% to 35% by weight of water, withdrawing gaseous butylenes substantially free of butadiene from the upper portion of the extraction zone, and withdrawing a liquid solution of butadiene substantially free of butylenes from the lower portion of the extraction zone.

3. A process for the separation of butadiene from butylenes which comprises contacting a gaseous mixture of butadiene and butylenes with a liquid selective solvent for the butadiene which consists of acetone and water and contains about 10% by weight of water.

4. A process for the separation of butadiene from butylenes which comprises contacting a gaseous mixture of butadiene and butylenes with a liquid selective solvent for the butadiene which consists of water and a member of the group consisting of acetone and methyl ethyl ketone, and contains from 5% to 35% by weight of water.

5. A process for the separation of a diolefin from a mono-olefin which comprises contacting a gaseous mixture of a diolefin and a mono-olefin containing the same number of carbon atoms with a selective solvent for the diolefin which consists of water and a member of the group consisting of acetone and methyl ethyl ketone, and contains from 5% to 35% by weight of water.

6. A process for the separation of a diolefin from a more saturated hydrocarbon which comprises contacting a gaseous mixture containing the diolefin and the more saturated hydrocarbon with a liquid selective solvent for the diolefin which consists of water and a member of the group consisting of acetone and methyl ethyl ketone, and contains from 5% to 35% by weight of water.

7. A process for the separation of an olefin from a paraffin hydrocarbon which comprises contacting a gaseous mixture of an olefin and a paraffin hydrocarbon with a liquid selective solvent for the olefin which consists of water and a member of the group consisting of acetone and methyl ethyl ketone, and contains from 5% to 35% by weight of water.

8. A process for the separation of an olefinic hydrocarbon from a gaseous hydrocarbon mixture containing the olefinic hydrocarbon and a hydrocarbon which is more saturated than said olefinic hydrocarbon which comprises contacting the gaseous hydrocarbon mixture with a liquid selective solvent for the olefinic hydrocarbon which consists of water and a member of the group consisting of acetone and methyl ethyl ketone, and contains from 5% to 35% by weight of water.

9. A process for the separation of an olefinic hydrocarbon from a gaseous hydrocarbon mixture containing the olefinic hydrocarbon and a hydrocarbon which is more saturated than said olefinic hydrocarbons, which comprises contacting the gaseous hydrocarbon mixture with a liquid selective solvent for the olefinic hydrocarbon which consists of water and a member of the group consisting of acetone and methyl ethyl ketone, and contains from about 7% to about 25% by weight of water.

10. A process for the separation of pentadienes from more saturated hydrocarbons containing five carbon atoms to the molecule which comprises contacting a gaseous mixture containing pentadienes and a more saturated hydrocarbon containing five carbon atoms with a liquid selective solvent for the pentadienes which consists of water and a member of the group consisting of acetone and methyl ethyl ketone, and contains from 5% to 35% by weight of water.

11. A process for the separation of pentadienes from more saturated hydrocarbons containing five carbon atoms to the molecule which comprises contacting a gaseous mixture containing pentadienes, pentenes and pentanes with a liquid selective solvent for the pentadienes which consists of water and a member of the group consisting of acetone and methyl ethyl ketone, and contains from 5% to 35% by weight of water.

12. A process for the separation of isoprene from a more saturated hydrocarbon containing five carbon atoms to the molecule which comprises contacting a gaseous mixture containing isoprene and a more saturated hydrocarbon containing five carbon atoms with a liquid selective solvent for the isoprene which consists of water and a member of the group consisting of acetone and methyl ethyl ketone, and contains from 5% to 35% by weight of water.

RUPERT C. MORRIS.
THEODORE W. EVANS.